US008244838B2

(12) United States Patent
Balasubramanian et al.

(10) Patent No.: US 8,244,838 B2
(45) Date of Patent: Aug. 14, 2012

(54) INDUSTRIAL CONTROLLER EMPLOYING THE NETWORK RING TOPOLOGY

(75) Inventors: Sivaram Balasubramanian, Solon, OH (US); Anatoly Moldovansky, Pepper Pike, OH (US); Brian A. Batke, Novelty, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 409 days.

(21) Appl. No.: 12/493,838

(22) Filed: Jun. 29, 2009

(65) Prior Publication Data
US 2010/0246385 A1    Sep. 30, 2010

Related U.S. Application Data

(63) Continuation of application No. 12/413,712, filed on Mar. 3, 2009, now Pat. No. 8,046,444.

(51) Int. Cl.
*G06F 15/177* (2006.01)
*G06F 11/00* (2006.01)

(52) U.S. Cl. .................. 709/221; 370/216; 370/222

(58) Field of Classification Search .......... 709/220–222; 370/216, 222
See application file for complete search history.

(56) References Cited

U.S. PATENT DOCUMENTS

| | | | |
|---|---|---|---|
| 4,887,256 A * | 12/1989 | Nakayashiki et al. | 370/224 |
| 6,430,151 B1 | 8/2002 | Glas et al. | |
| 6,594,227 B1 * | 7/2003 | Ogawa et al. | 370/216 |
| 7,385,919 B2 | 6/2008 | Koestner et al. | |
| 8,046,444 B2 * | 10/2011 | Klug et al. | 709/222 |
| 2004/0017808 A1 * | 1/2004 | Forbes et al. | 370/390 |
| 2008/0212564 A1 * | 9/2008 | Lee et al. | 370/350 |
| 2009/0003313 A1 * | 1/2009 | Busch et al. | 370/352 |
| 2010/0111066 A1 * | 5/2010 | Mehta | 370/345 |

* cited by examiner

*Primary Examiner* — Joseph Avellino
*Assistant Examiner* — Jeong S Park
(74) *Attorney, Agent, or Firm* — Boyle Fredrickson, S.C.

(57) ABSTRACT

A network for an industrial control system employs a ring topology that is normally opened by a ring supervisor at the ring supervisor. Upon failure of the network, the ring supervisor reconnects the ring to provide an alternative transmission path around the failure point. High speed operation is reconciled with the ability to use commercial switching integrated circuits through a dual communication channel of communicating a network state as either closed or open using both high-speed hardware handled beacon frames and low-speed software processed announce frames.

19 Claims, 4 Drawing Sheets

INDUSTRIAL CONTROLLER EMPLOYING THE NETWORK RING TOPOLOGY

BACKGROUND OF THE INVENTION

The subject matter as disclosed herein relates to industrial controllers communicating among components by computer networks and in particular by Ethernet type networks.

Networks used for communication among industrial controllers differ from standard networks in that they must operate to communicate data reliably within predefined time limits. Often this is accomplished by additional communication protocols that reserve network bandwidth and schedule messages to prevent collisions and the like that can introduce unpredictable delay into network communications.

Many computer networks also incorporate protocols to repair the network in the event of network node failure. These protocols can take a relatively long time to reconnect the network (as much as 30 seconds) and thus are unacceptable for industrial control networks where the controlled process cannot be undirected during this period without disastrous consequences.

The risk of debilitating network failure in an industrial control can often be avoided using a redundant network topology, for example, where network nodes are connected in a ring with a supervisor. Normally the ring is opened at the supervisor node for all standard data and thus operates in a normal linear topology. The supervisor may send out test "telegram" or "beacon" frames in one direction on the ring which are received back at the supervisor in the other direction to indicate the integrity of the ring. If the ring is broken, such as by a node or media failure, the supervisor joins the ends of the ring to produce once again a continuous linear topology now separated by the failed component. Changes in the mode of operation of the supervisor from "separated" to "joined" may be transmitted to the other nodes using notification frames so that these nodes can rebuild their MAC address routing tables used to associate a port with a destination address.

The error detection time of such ring systems can be quite fast, limited principally by the transmission rate of the beacons (every several milliseconds). This rate defines the maximum time before which an error is detected and the ring may be reconfigured.

SUMMARY OF THE INVENTION

The present inventors have recognized that even faster recovery time can be achieved by communicating the topology change in the beacon frame itself, along with monitoring reception or non-reception of beacon frames in ring nodes. Such an approach practically requires a hardware processing of the beacon frames at the network nodes with custom embedded switches in the form of application specific integrated circuits (ASIC), so that the network nodes can monitor reception or non-reception of the beacon frame along with data in the beacon frame rather than simply passing the beacons from port to port as is required in prior art systems.

The benefit is much faster recovery times; however, such hardware processing would ordinarily preclude use of this system with nodes using commercially available switching integrated circuits (IC). Accordingly, the present invention also contemplates a dual-mode announcing system that transmits topology state change both in the beacon frames and in special announce frames that can be processed by ring protocol aware nodes using commercial switching IC. In addition, the present invention also allows ring protocol unaware commercial off-the-shelf managed switches to be directly connected to ring when the switches are appropriately configured.

These particular features and advantages may apply to only some embodiments falling within the claims and thus do not define the scope of the invention.

DETAILED DESCRIPTION OF THE PREFERRED EMBODIMENT

Figure 1:
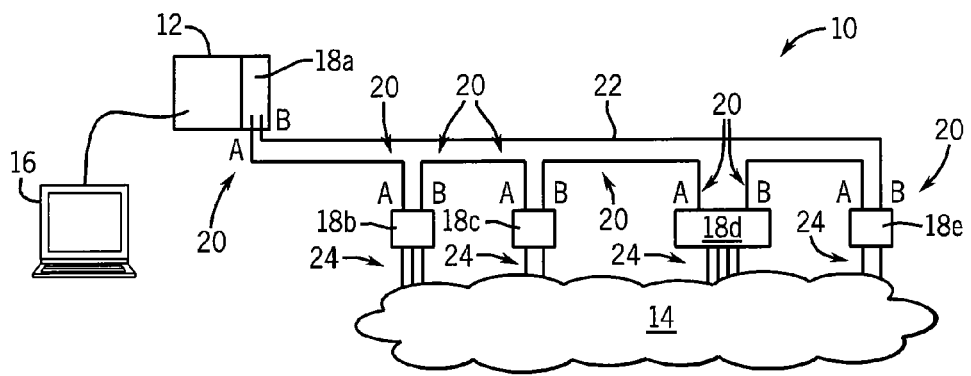
FIG. 1 is a diagram of an industrial control network configured for use of the present invention.

Referring now to FIG. 1, an industrial control network 10 may include, for example, a programmable logic controller 12 executing a stored program to provide for real-time control of an industrial process 14. Real-time control, in this context, means control that is subject to well-defined maximum delay periods between an output signal generated by the programmable logic controller 12 and electrical signal sent to an actuator in the industrial process 14, and similarly well-defined maximum delay period between the generation of a signal by a sensor in the industrial process 14 and its receipt and processing by the programmable logic controller 12.

Normally the programmable logic controller 12 includes an electronic computer executing a stored program providing detailed logic for the necessary control. Often the stored program is generated uniquely for the particular industrial process 14.

The programmable logic controller 12 may communicate with a terminal device 16 that allows for the configuration of the industrial controller, including the generation of the control program and the initialization of its components. The programmable logic controller 12 may also communicate with a network node 18 (in this example network node 18a) implementing protocols suitable for Ethernet or internet protocol (IP) or other control network protocols. The network node 18a may be an Ethernet node having a processor 44, two ports 20 (labeled A and B respectively) and an embedded switching ASIC 45 to switch network traffic between two ports and the processor 44. In this example, this node 18a will provide for layer 2 protocol to implement a full/half duplex IEEE 802.3 Ethernet network.

Ports A and B each connect to network media 22, for example, copper conductors or fiber optic links having a bandwidth of at least 100 Mbps in full duplex mode. The media 22 may connect to other network nodes 18b, 18c, 18d and 18e each also having a processor 44, two ports 20 (A and B) and a custom embedded switching ASIC 45 or a commercial embedded switching IC 43. The other network nodes 18 may also include ring protocol aware switches and/or ring protocol unaware commercial off-the-shelf ("COTS") managed switches, each with three or more ports with two ports connected to ring and remaining ports connected to other single port or multi-port network nodes. The network nodes 18b-e may communicate with I/O circuits or other control devices providing signals along conductors 24 to and from the industrial process 14 for control thereof.

The media 22 interconnects the ports 20 of the network nodes 18 to produce a ring topology, that is, one in which by following the media 22 one may arrive successively at each node 18 once passing through each of the ports A and B of each of the nodes 18. The ring topology represents a physical connection and is independent of whether frames may actually pass through the ports A and B as may be prevented by failure of the media 22 or of one or more network nodes 18.

Figure 2:
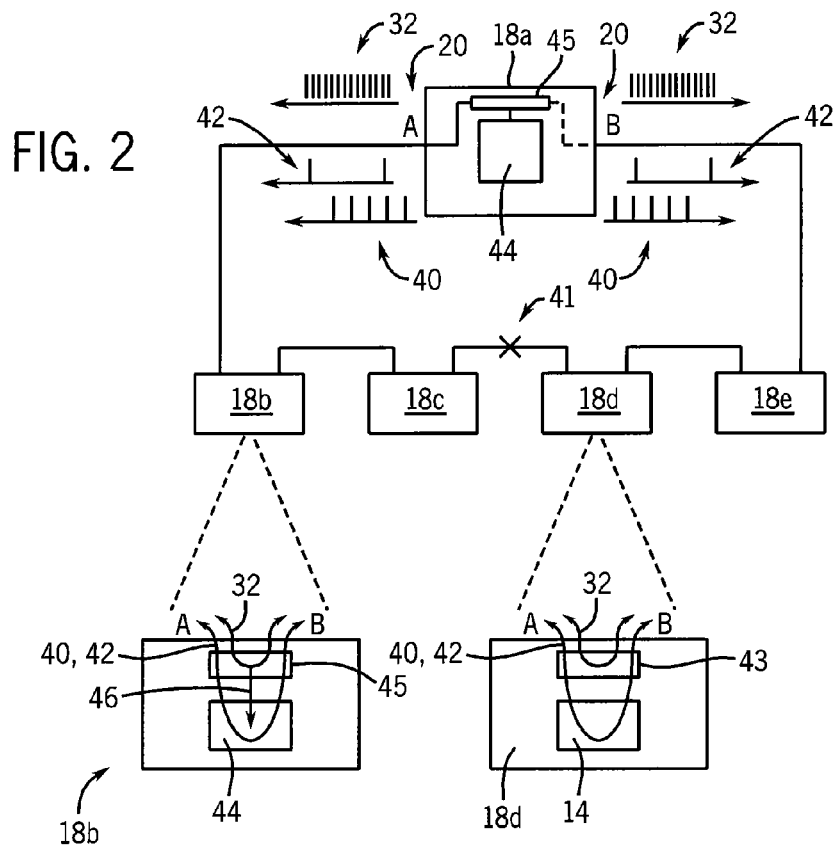
FIG. 2 is a logical diagram of the network of FIG. 1 showing the processing of ring network protocol frames including announce frames and beacon frames and further showing the processing of these frames by ring protocol-aware beacon frame processing network nodes (including an active supervisory node) and by ring protocol aware announce frame processing network nodes.

Referring now to FIG. 2, the nodes 18 can be generally in several categories. First, there are "beacon frame processing", protocol-aware nodes 18 tailored for the present invention with special hardware embedded switch ASIC 45 and in this example being nodes 18a, 18b, 18c, and 18e. Second are "announce frame processing" protocol aware nodes 18 that use commercial embedded switch IC 43, including node 18d in this example. The control network 10 may also include beacon or announce frame processing protocol aware switches with more than two ports and protocol unaware COTS managed switches with more than two ports.

The beacon frame processing protocol-aware nodes 18 in this example can be divided into nodes that may assume a supervisory capacity, in this case, nodes 18a and 18c, and nodes that cannot assume a supervisory capacity, in this case, nodes 18b and 18e. The difference between the protocol-aware beacon frame processing nodes and the announce frame processing nodes principally concerns whether they have a hardware assist element in the form of embedded switch ASIC 45, as will be described, or equal capability provided by this hardware assist element. The difference between the beacon frame processing protocol-aware nodes that can assume supervisory capacity and those that can't is largely a function of software programming. Generally, all beacon frame processing protocol-aware nodes are capable of acting as back-up supervisory nodes if they are so programmed.

During normal operation, one node (in this case node 18a) will operate as the active supervisory node 18a (also termed an active ring supervisor) and in this capacity will send three types of frames from each of its ports 20. First, the supervisory node 18a will send beacon frames 32 out of each of its ports A and B. The beacon frames may be transmitted at an extremely high rate, typically one every 400 μs or immediately upon change of ring state event.

Figure 5:
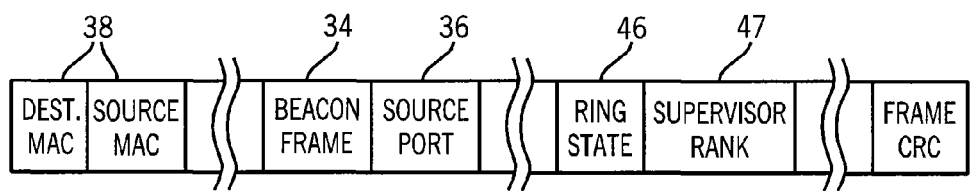
FIG. 5 is a depiction of the fields of the beacon frames communicating ring state and allowing transfer of responsibilities of the supervisory node.

Referring momentarily to FIG. 5, each beacon frame 32 will include data 34 identifying it as a beacon frame 32, data identifying a source port 36 indicating the port A or B from which it is transmitted, and a source and destination MAC address 38, source being the MAC address of the supervisory node 18a transmitting the beacon frame 32 and a destination that will be apparent by context. The beacon frame 32 also includes ring state data 46 indicating a ring state, indicating whether the ends of the ring are open at the supervisory node 18a meaning that frames are not passed between ports A and B (open mode) or the ends of the ring are closed at the supervisory node 18a allowing frames to pass between ports A and B (closed mode). Finally, the beacon frame 32 holds data 47 indicating the rank of the current supervisory node 18a as will be described below.

Referring again to FIG. 2, the supervisory node 18a also transmits conventional Ethernet data frames 40 carrying data for the control of the industrial process 14. These data frames 40 will be directed to particular nodes 18 through a port A or B determined by an internal routing table constructed according to methods known in the art.

In addition, the supervisory node 18a may transmit ring protocol frames 42 which do not carry control data but serve to indicate the state of the network. The ring protocol frames 42 include (1) "announce frames" that transmit from the supervisory node 18a the ring as either open or closed mode in a manner similar to the beacon frames 32, (2) "link status frames" transmitted from the nonsupervisory nodes 18 to the supervisory node 18a to indicate physical media failure, (3) "locate fault frames" transmitted by the supervisory node 18a to other nodes 18 to determine location of a fault, (4) "neighbor check request frames" and "neighbor check response frames" forming part of the fault location process as will be described; and (5) "neighbor status frames" transmitted from the nonsupervisory nodes 18 to the supervisory node 18a forming part of fault location process. Typically the announce frames are transmitted at a much lower rate than the beacon frames, for example, once per second or immediately upon change of ring state event. The other ring protocol frames 42 are transmitted only occasionally upon certain events. All ring protocol frames are encoded with highest priority and are transmitted and processed with highest priority on all ring protocol aware nodes or switches and protocol unaware managed switches to provide deterministic ring network performance.

As noted above, supervisory node 18a may operate in two distinct modes. In the open mode, data frames 40 received at a given port A (not intended for the supervisory node 18a) are not forwarded to the opposite port B and vice a versa. In the closed mode, data frames 40 received at a given port A (and not intended for supervisory node 18a as a destination) will be forwarded to the port B. Generally in both modes beacon frames 32 and announce frames 42 transmitted from one port A are detected at the other port B and vice a versa but not forwarded.

Referring still to FIG. 2, the beacon frames 32 and the announce frames 42 and the data frames 40 will be dealt with differently at each of the non-supervisory nodes 18b-e, in particular between the beacon frame processing nodes 18b, 18c, 18e, and the announce frame processing node 18d.

As an example in a beacon frame processing node 18b, each of the beacon frames 32 will generally be passed from port A to port B or vice versa by the hardware assist element 45 (typically a custom embedded switch ASIC) without modification or without substantial processing by the node processor 44 which handles all other aspects of the ring protocol for standard data frames. In transferring the beacon frames 32, hardware assist element 45 will generally extract only a ring state data 46 shown in FIG. 5 from the beacon frames 32 which are passed to the processor 44 for processing as will be described. This ring state data 46 indicates whether the network 10 is operating with the open or closed mode topology as described above. In addition, the hardware assist element 45 will monitor non-reception of beacon frames 32 on both ports in open mode and reception of beacon frames on both ports in closed mode as will be described.

In the beacon frame processing node 18b, other data frames 40 and ring protocol frames 42 are forwarded to the processor 44 for processing according to a stored program following normal network protocols or those special procedures that will be described below.

In contrast, the announce frame processing node 18*d* does not include the hardware assist element 45 (e.g. a custom embedded switch ASIC). In this case, the beacon frames 32 are processed by commercial embedded switch IC 43 which simply forwards it from port A to port B and vice versa. More generally, the beacon frames 32 are passed quickly through the announce frame processing node 18*d* without monitoring of the ring state data 46 while other data frames 40 destined for node 18*d* and ring protocol frames 42 are processed at a slower rate through the standard processor 44. The processor 44 will extract ring state data from announce frame and will take appropriate action upon change of state events.

Figure 3:
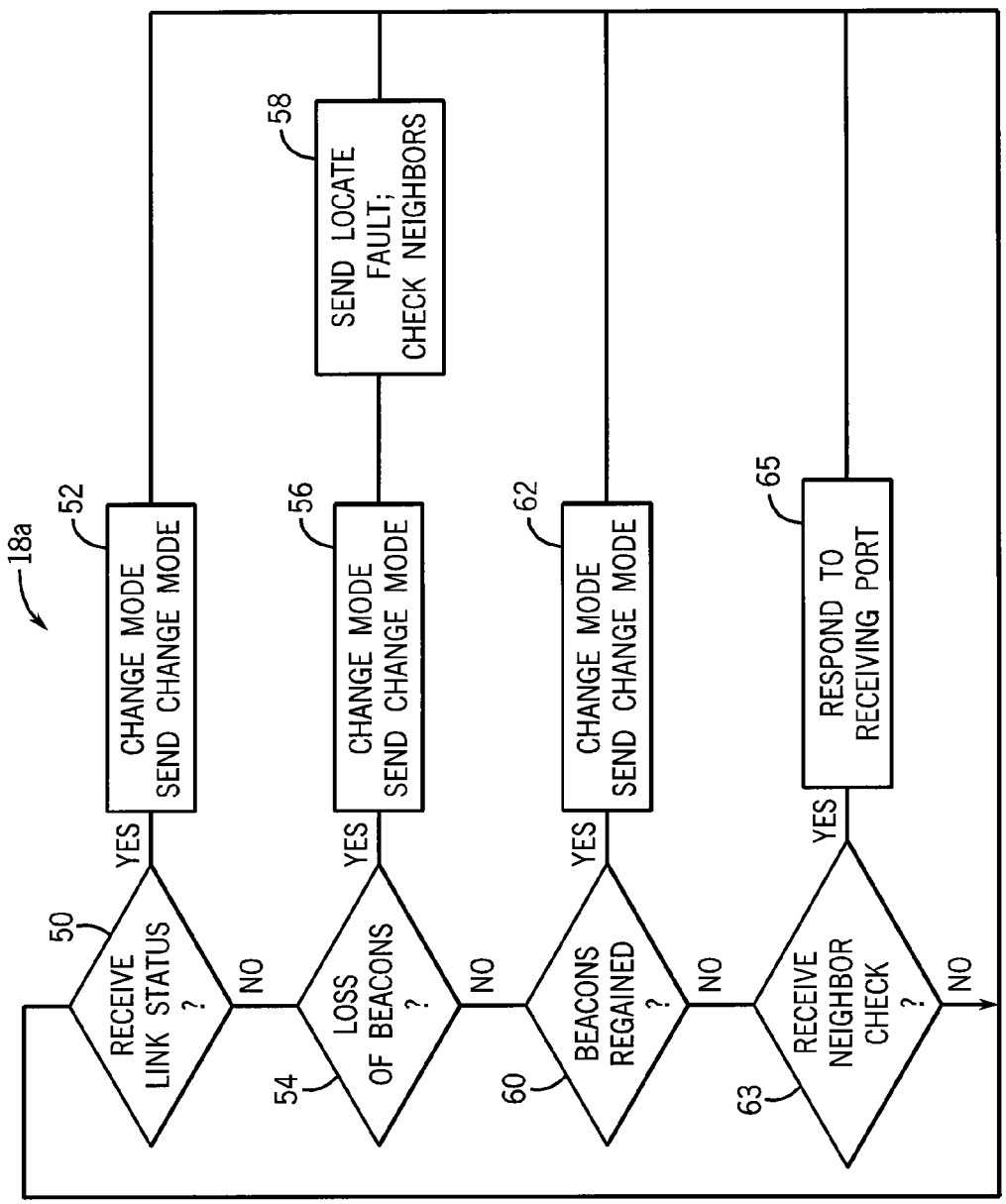
FIG. 3 is a flow chart of the operation of the active supervisory node of FIG. 2.

Referring now to FIG. 3, an active supervisory node 18*a* may execute a stored program in processor 44 to monitor link status frames 42 from any of the nonsupervisory mode protocol-aware nodes 18 and to detect a link failure on one of its own ports. This monitoring is shown by decision block 50. These link status frames 42 generally indicate a physical layer failure detected by a ring node using IEEE 802.3 fault detection techniques (for example detecting a loss of voltage at a port A or B by the node 18 transmitting the link status frame 42). An example physical layer failure is shown at point 41 in FIG. 2 and may be transmitted by adjacent nodes 18*c* and 18*d*.

Upon receipt of a link status frame 42 indicating such a failure or upon detecting a link failure on one of its ports, the active supervisory node 18*a* will move to a closed mode connecting its ports A and B to allow conventional data frames 40 to pass there through thus restoring continuity of transmission to the nodes 18 around a break at point 41 caused by a failure of physical media or the like. The active supervisory node 18*a* immediately transmits a mode change to the other nodes 18 as indicated by process block 52 through both of its ports A and B. This mode change is transmitted immediately in the beacon frames 32 as ring state data 46 as shown in FIG. 5. The supervisory node 18*a* also immediately transmits information about the mode change to announce frame processing nodes 18 by means of the announce frame 42.

Absent a receipt of a link status signal indicating a break at a local node or loss of link on its own port, the active supervisory node 18*a* may also detect a loss of beacons on one or the other of its ports A and B as indicated by decision block 54. This detection occurs when either port A fails to receive beacon frames transmitted from port B or vice a versa within a predefined beacon timeout period. Such a beacon loss may detect failures undetectable by the other nodes 18, for example high-level failures that leave the physical layer functioning or physical layer failures between two ring protocol unaware COTS managed switches which are not capable of transmitting the link status message. An example of such a failure would be an internal embedded switch failure of network node 18*d*. Upon such a detection of a loss of beacons, as indicated by the process block 56, again the ports A and B are connected with each other and mode change data is forwarded to the other nodes 18 (in beacon frames 32 and announce frames 42) in a manner analogous to process block 52. Then, at process block 58, the supervisory node 18*a* sends a locate fault frame to the protocol-aware nodes 18 to help identify the location of the fault and starts verification of its own neighbors on both of its ports. This process will be described further below.

At a later time, as indicated by process block 60, the active supervisory node 18*a* may detect a restoration of the beacon frames 32 at both of its ports A and B, that is, beacon frames received at port A from port B and vice a versa. If so, the active supervisory node 18*a* separates ports A and B with respect to traffic and immediately sends a mode change signal at process block 62 indicating that the open mode has been restored. The mode change data is transmitted immediately in beacon frames 32 and announce frames 42.

Figure 4A:
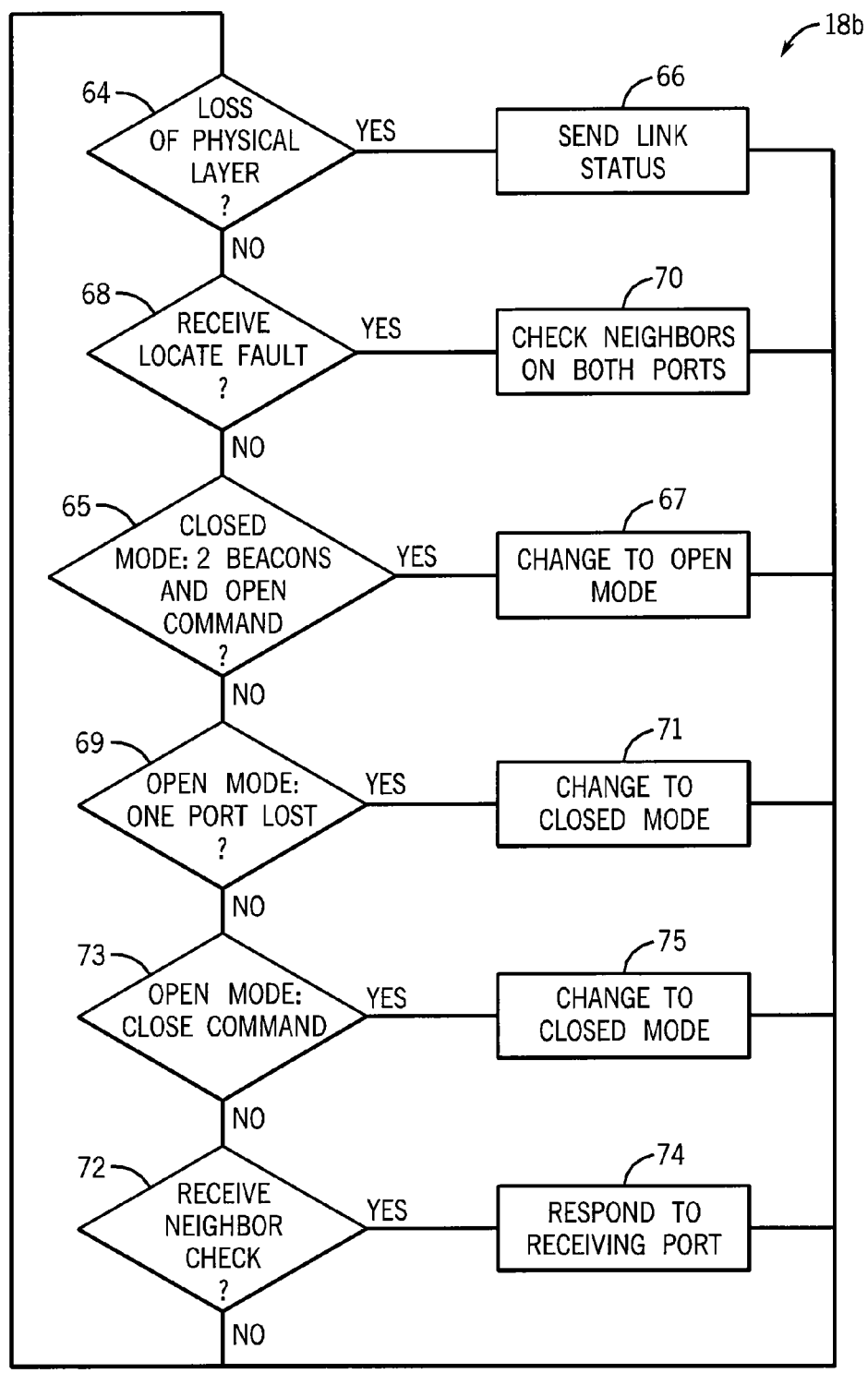
FIG. 4a is a flow chart of the operation of the protocol-aware beacon frame processing network nodes of FIG. 2 not operating as supervisory nodes.
Figure 4B:
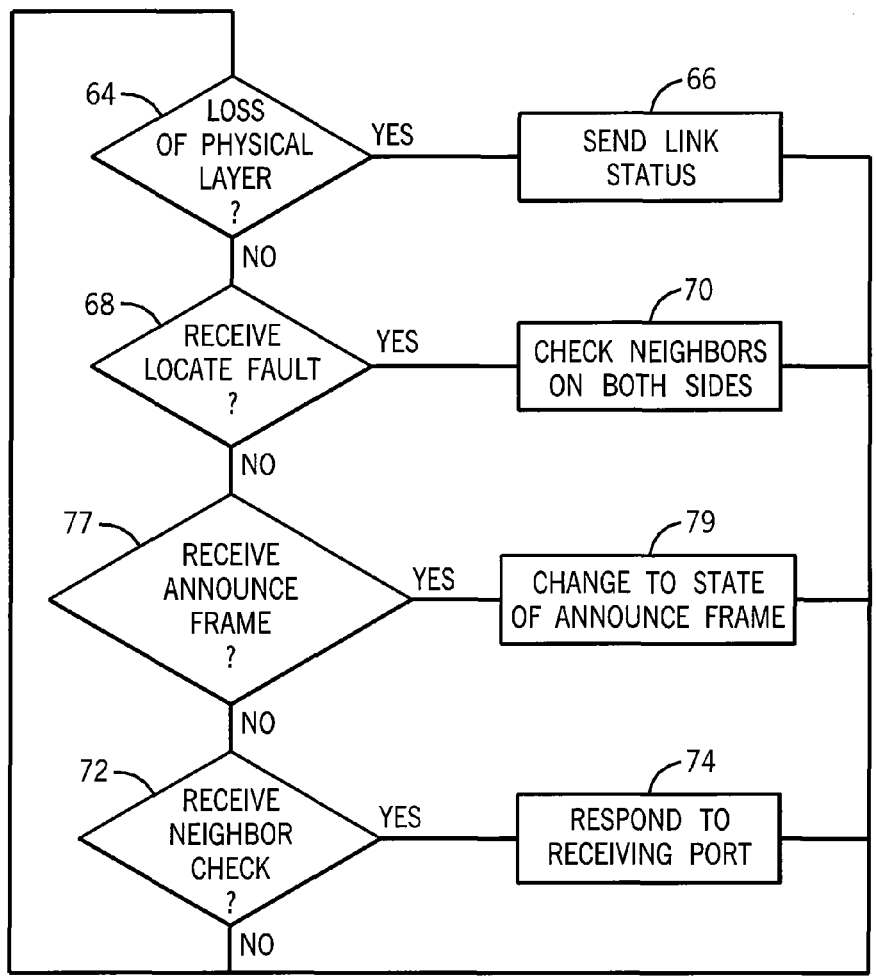
FIG. 4b is a flow chart similar to that of FIG. 4a of the operation of the protocol-aware announce frame processing network nodes of FIG. 2.

Referring now to FIGS. 4*a* and 4*b*, each of the protocol-aware nodes 18, other than the active supervisory node 18, similarly executes software supporting their roles in the above process. Thus, for example, each of these nodes 18 monitor their physical connections as indicated by decision block 64 to check for loss of a physical link. Such physical link failures will be detected only by the nodes 18 adjacent to the failure and can result from hardware network interface failures or cut media or intentionally disconnected media, for example when new nodes are being connected. When such a loss is detected, the ring protocol-aware nodes 18 send a link status frame indicating the failure to the supervisory node 18*a* as indicated by process block 66. This allows active supervisory node 18*a* to pinpoint failure location as a diagnostic aid to user.

The protocol-aware nodes 18 also monitor the ring protocol frames 42 for a locate fault frame from the active supervisory node 18*a* as indicated by decision block 68 sent by the supervisory node 18*a* as indicated by process block 58 described above. When such a locate faults signal is received, at process block 70, the protocol-aware nodes 18 send messages to a neighboring node 18 on both ports.

As indicated by decision block 72, each neighbor node 18 receiving such a neighbor check request frame as detected at decision block 72 responds with neighbor check response frame on the receiving port as indicated by process block 74 indicating that they have received the message. When a neighbor fails to respond, the requesting node sends a neighbor status frame to active supervisory node. This allows active supervisory node to pinpoint failure location as a diagnostic aid to user.

A locate fault frame may be sent at any time by the supervisory node 18*a* to update stale information. Non-supervisory nodes will always pass frames between both ports irrespective of current ring state mode.

The operation of the beacon frame processing nodes (e.g., 18*b*) and the announce frame processing nodes (e.g. 18*d*) differ at this point.

Referring to FIG. 4*a*. for a beacon processing node 18*b*, when the ring is in the closed mode, the beacon frame processing nodes 18 monitor reception of beacons on both ports. Upon reception of beacon frames 32 on both ports as detected at decision block 65 and reception of at least one beacon frame on either port indicating a mode change to open mode ring state, they will change mode to open mode as indicated by process block 67.

Alternatively, when in open mode, as indicated by process block 69, the beacon frame processing nodes 18 monitor reception of beacons on both ports. Upon non-reception of beacon frame 32 on either port with predetermined beacon timeout period, they will change mode to closed mode per process block 71. Alternatively, upon reception of at least one beacon with ring state closed mode in either port, detected per process block 73, they will change mode to closed mode per process block 75.

Referring now to FIG. 4*b*, in contrast, the announce frame processing nodes 18 simply follow ring state mode as received in announce frame from active supervisory node per decision block 77 and conform to that received mode per process block 79.

All protocol aware nodes 18 including active supervisory node 18*a* will flush their unicast and multicast MAC address routing tables for two ring ports immediately upon ring state mode changes and relearn routing tables so that data frames are forwarded through correct ports as known in the art.

The present invention contemplates that there may be backup ring supervisors to active ring supervisory node 18*a*. At the initialization of the network 10, each such potential ring supervisor is given a unique number in the sequence. The current supervisor number is transmitted as a supervisor rank 47 in the beacon frame 32. In a situation when new supervisory nodes start operation or during initialization of network 10, multiple potential supervisors may all send beacon frames 32 containing their supervisor rank 47. The vying supervisors monitor the beacon frames 32 and withdraw when they detect beacon frames 32 from other supervisor having a dominant supervisor rank 47 (higher or lower by predetermined convention). When two supervisor numbers are equal, dominant supervisor is selected by the numerically higher (or lower by predetermined convention) MAC address of the supervisor. The beacon frame processing non-supervisory nodes use same algorithm to track active supervisor. The announce frame generation by new supervisors is delayed for predetermined duration when a clearly defined active supervisor is not selected and after this delay the announce frame is sent by active supervisor, resulting in announce frame processing nodes learning about new active supervisor.

When beacon frames from an active ring supervisory node 18*a* are not detected by a backup ring supervisor node 18 for a predetermined period of time, all potential supervisory nodes 18 will switch to closed mode for a predetermined quiet period. At the end of this quiet period, the backup ring supervisors will send their own beacon frames as described above and the new ring supervisor will be selected.

During start up, the active supervisory node 18*a* will start in closed mode (passing frames between its ports) and will switch to open mode when it receives its own beacon frames on both of its ports. Each beacon frame processing node 18 will start in the closed mode and will switch to the open mode only when they receive beacon frames from active supervisory node on both of their ports and with open mode in ring state of beacon frame on at least one port. Each announce frame processing node 18 will simply follow mode as received in announce frame from active supervisory node. Non-supervisory nodes including back up supervisory nodes always pass frames between their ports irrespective of current ring state mode of operation.

The present invention can detect and respond to several unusual situations. For example, each protocol-aware node 18 may monitor the arrival of its own frames back to its other port. This indicates an incorrect network loop when an active supervisory node is not present and the nodes 18 may respond by notifying the user of an error. It is possible for the ring supervisory node 18*a* to repeatedly respond to an intermittent or loose connector (a media fault) by cycling between closed mode and open mode. The ring supervisory node 18*a* may track the number of faults within a predetermined time interval and when the number of faults exceeds a predetermined threshold, it may block traffic forwarding, stop cycling between modes and provide a warning to the user of this situation.

It is possible for high-level faults to occur such that frames are lost in only one direction. When this situation is detected, the active ring supervisory node 18*a* may block traffic forwarding in one direction and notify the user of a fault condition.

The technical effect of the invention is to provide faster recovery of network errors.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from liberal language of the claims. Generally, as will be recognized by those of ordinary skill in the art, the features of the present invention may be implemented in different combinations of hardware and software executing on an electronic computer including just one or the other.

We claim:

1. A ring network comprising:
a plurality of switching nodes providing layer 2 functionality to forward data frames between ports based on dynamically learnt MAC address routing tables, each switching node having at least a first and second port connectable to network media, the switching nodes arranged in a ring wherein the first and second ports of each switching node connect to different switching nodes of the ring and wherein at least one of the switching nodes is an active ring supervisor, at least one of the switching nodes further including first and second frame processing circuitry, wherein the first frame processing circuitry is faster than the second frame processing circuitry,
wherein the active ring supervisor is adapted to operate to:
(a) transmit beacon frames out of each port at a first rate and monitor the other port for reception of beacon frames, wherein the beacon frames indicate a state of operation of the ring network as a closed mode or an open mode, the beacon frames further including identifying data directing them to be processed by the first frame processing circuitry;
(b) transmit announce frames out of one port at a second rate slower than the first rate wherein the announce frames indicate the state of operation of the ring network as closed mode or open mode, the announce frames not having identifying data directing them to be processed by the first frame processing circuitry, the announce frames processed by the second frame processing circuitry;
(c) respond to a receipt of beacon frames between the first and second ports by blocking data frames between the first and second ports in an open mode;
(d) respond to failure of the beacon frames to traverse the ring by changing to a closed mode passing data frames between the first and second ports; and
wherein switching nodes that are not the active ring supervisor are adapted to operate to:
(a) pass beacon frames between the first and second ports;
(b) pass announce frames between the first and second ports; and
(c) respond to a change in the state of operation of the ring network deduced from either
(i) non-receipt of beacon frames on either port or;
(ii) receipt of beacon frames or announce frames indicating a change in operating between closed mode or open mode to reset their MAC address routing tables.

2. The ring network of claim 1 wherein at least some switching nodes that are not the active ring supervisor detect a change in the state of operation from the announce frames.

3. The ring network of claim 1, wherein at least some switching nodes that are not the active ring supervisor detect a change in the state of operation from data in the beacon frames.

4. The ring network of claim 1 wherein the switching nodes that are not the active ring supervisor further respond to a change of state from an open mode to a closed mode by checking for communication with immediate neighbor node on each of their ports and reporting back to the active ring supervisor if one port provides for no communication.

5. The ring network of claim 1 wherein the switching nodes that are not the active ring supervisor further respond to a detected physical layer failure on one port by reporting back to the ring supervisor indicating a failed port.

6. The ring network of claim 1 wherein the active supervisory node transitions from open mode to closed mode when one of non-supervisory ring node reports a physical layer failure.

7. The ring network of claim 1 wherein the active supervisory node initiates ring fault location diagnostics in closed mode and reports back fault location information to the user.

8. The ring network of claim 1 wherein at least some switching nodes that are not the active ring supervisor are commercial off-the-shelf managed switches.

9. The ring network of claim 1 wherein the beacon frame further indicates a current ring supervisor rank of the ring supervisor and wherein there are multiple potential ring supervisors in the ring network each having a unique supervisor rank and the multiple potential ring supervisors are adapted to operate as switching nodes that are not active ring supervisors so long as beacon frames exist indicating a current active ring supervisor with a dominant rank.

10. The ring network of claim 1 wherein the active ring supervisor in the closed mode responds to the receipt of beacons between both of its first and second ports immediately without waiting for an expiration of a predetermined time interval.

11. The ring network of claim 1 wherein the announce frames are transmitted at a rate of at less than one per 500 milliseconds.

12. The ring network of claim 1 wherein the beacon frames are transmitted at a rate greater than once per millisecond.

13. An IEEE 802.3 Ethernet ring topology supervising network switch for use with a ring network including a plurality of switching nodes providing Layer 2 functionality to forward data frames between ports based on dynamically learnt MAC address routing tables, each switching node having at least a first and second port connectable to network media, the switching nodes arranged in a ring wherein the first and second ports of each switching node connect to different switching nodes of the ring, and at least one of the switching nodes further including first and second frame processing circuitry, wherein the first frame processing circuitry is faster than the second frame processing circuitry, the supervising network switch comprising a processing unit coupled to a first and second network port and executing a stored program to:
  (a) transmit beacon frames out of each port at a first rate and monitor the other port for reception of beacon frames, wherein the beacon frames indicate a state of operation of the ring network as a closed mode or an open mode, the beacon frames further including identifying data directing them to be processed by the first frame processing circuitry;
  (b) transmit announce frames out of one port at a second rate slower than the first rate wherein the announce frames indicate the state of operation of the ring network as closed mode or open mode, the announce frames not having identifying data directing them to be processed by the first frame processing circuitry, the announce frames processed by the second frame processing circuitry;
  (c) respond to a receipt of beacon frames between the first and second ports by blocking data frames between the first and second ports in an open mode and transmitting data indicating the change in different announce frames and beacon frames, to indicate a change to the open mode to cause other switching nodes to reset their MAC address routing tables;
  (d) respond to failure of the beacon frames to traverse the ring by changing to a closed mode and passing data frames between the first and second ports and transmitting data in the announce frames and beacon frames to indicate a change to the closed mode to cause other switching nodes to reset their MAC address routing tables.

14. The ring network of claim 13 wherein the supervising network switch in the closed mode responds to the receipt of beacons between both of its first and second ports immediately without waiting for the expiration of a predetermined time interval.

15. The ring network of claim 13 wherein the supervising network switch initiates ring fault location diagnostics in closed mode and reports back fault location information to the user.

16. The ring network of claim 13 wherein at least some of the nodes not operating as a ring supervisor are Ethernet layer 2 switches that cannot monitor the beacon frames.

17. The ring network of claim 13 wherein the announce frames are transmitted at a rate of at less than one per 500 milliseconds.

18. The ring network of claim 13 wherein the beacon frames are transmitted at a rate greater than once per millisecond.

19. An IEEE 802.3 Ethernet ring network comprising:
  a plurality of switching nodes providing Layer 2 functionality to forward data frames between ports based on dynamically learnt MAC address routing tables, each switching node having at least a first and second port connectable to network media, the switching nodes arranged in a ring wherein the first and second ports of each switching node connect to different switching nodes of the ring and wherein at least one of the switching nodes is an active ring supervisor, at least one of the switching nodes further including first and second frame processing circuitry, wherein the first frame processing circuitry is faster than the second frame processing circuitry;
  wherein the active ring supervisor is adapted to operate to:
  (a) transmit beacon frames out of each port at a first-rate and monitor the other port for reception of beacon frames, wherein the beacon frames indicate a state of operation of the ring network as a closed mode or an open mode and a current ring supervisor rank of the ring supervisor, the beacon frames further including identifying data directing them to be processed by the first frame processing circuitry;
  (b) respond to a receipt of beacon frames between the first and second ports by blocking data frames between the first and second ports in an open mode and transmitting data in the beacon frames to indicate a change to the open mode to cause other switching nodes to reset their MAC address routing tables;
  (c) respond to failure of the beacon frames to traverse the ring by passing data frames between the first and second ports and transmitting data in the beacon frames to indicate a change to a closed mode to cause other switching nodes to reset their MAC address routing tables;

wherein switching nodes that are not the active ring supervisor are adapted to operate to:

(a) pass beacon frames between the first and second ports;

(b) respond to a change in the state of operation of the ring network deduced either from non-receipt of beacon frames on either port or receipt of beacon frames on both ports or from the data in beacon frames as operating in closed mode or open mode to reset their MAC address routing tables; and wherein there are multiple potential ring supervisors in the ring network each having a unique supervisor rank and the multiple potential ring supervisors are adapted to operate as switching nodes that are not active ring supervisors so long as beacon frames exist indicating a current active ring supervisor with a dominant rank.

* * * * *